US006908726B2

(12) United States Patent
Korionoff et al.

(10) Patent No.: US 6,908,726 B2
(45) Date of Patent: Jun. 21, 2005

(54) THERMALLY IMAGEABLE ELEMENTS IMAGEABLE AT SEVERAL WAVELENGTHS

(75) Inventors: Lee Korionoff, Fort Collins, CO (US); Ting Tao, Fort Collins, CO (US); Kevin B. Ray, Fort Collins, CO (US)

(73) Assignee: Kodak Polychrome Graphics LLC, Norwalk, CT (US)

( * ) Notice: Subject to any disclaimer, the term of this patent is extended or adjusted under 35 U.S.C. 154(b) by 113 days.

(21) Appl. No.: 10/409,301

(22) Filed: Apr. 7, 2003

(65) Prior Publication Data

US 2004/0197697 A1 Oct. 7, 2004

(51) Int. Cl.$^7$ .................. G06F 7/039; C07D 417/02; C07D 421/02
(52) U.S. Cl. ................... 430/273.1; 430/270.1; 430/302; 430/309; 430/401; 430/434; 430/348; 430/945; 430/944; 430/326; 430/494; 548/121; 548/157; 548/305; 548/439; 548/415; 252/587; 101/458; 101/467
(58) Field of Search ............... 430/273.1, 270.1, 430/302, 309, 401, 434, 348, 945, 944, 326, 494; 548/121, 157, 305, 439, 415; 252/587; 101/458, 467

(56) References Cited

U.S. PATENT DOCUMENTS

| 4,708,925 | A | 11/1987 | Newman |
|---|---|---|---|
| 5,372,907 | A | 12/1994 | Haley et al. |
| 5,700,619 | A | 12/1997 | Baumann et al. |
| 5,763,134 | A | 6/1998 | Busman et al. |
| 5,900,348 | A | 5/1999 | Hu et al. |
| 5,919,601 | A | 7/1999 | Nguyen et al. |
| 5,965,319 | A | 10/1999 | Kobayashi |
| 6,090,532 | A | 7/2000 | West et al. |
| 6,280,899 | B1 | 8/2001 | Parsons et al. |
| 6,358,669 | B1 | 3/2002 | Savariar-Hauck et al. |
| 6,391,519 | B1 | 5/2002 | Kunita |
| 6,787,281 | B2 * | 9/2004 | Tao et al. ............. 430/270.1 |
| 6,790,590 | B2 * | 9/2004 | Collins et al. ........... 430/273.1 |
| 2002/0136961 | A1 | 9/2002 | McCullough et al. |
| 2004/0131973 | A1 * | 7/2004 | Tao et al. ................ 430/302 |

FOREIGN PATENT DOCUMENTS

| EP | 1 162 078 A2 | 12/2001 |
| EP | 1 291 172 A1 | 3/2003 |
| WO | WO 00/17711 | 3/2000 |

* cited by examiner

*Primary Examiner*—Cynthia Hamilton
(74) *Attorney, Agent, or Firm*—RatnerPrestia

(57) ABSTRACT

Infrared absorbing compounds that absorb at 800 nm±50 nm and at 1050 nm±50 nm, the two different regions of the infrared spectrum typically used for imaging, are disclosed. Thermally imageable elements that comprise these infrared absorbing compounds can be imaged with radiation in either of these two regions of the infrared spectrum. The elements are especially useful as lithographic printing plate precursors.

27 Claims, No Drawings

THERMALLY IMAGEABLE ELEMENTS IMAGEABLE AT SEVERAL WAVELENGTHS

FIELD OF THE INVENTION

The invention relates to lithographic printing. In particular, this invention relates to thermally imageable elements, useful as printing plate precursors, that can be imaged with either of two different regions of infrared radiation.

BACKGROUND OF THE INVENTION

In lithographic printing, ink receptive regions, known as image areas, are generated on a hydrophilic surface. When the surface is moistened with water and ink is applied, the hydrophilic regions retain the water and repel the ink, and the ink receptive regions accept the ink and repel the water. The ink is transferred to the surface of a material upon which the image is to be reproduced. Typically, the ink is first transferred to an intermediate blanket, which in turn transfers the ink to the surface of the material upon which the image is to be reproduced.

Imageable elements useful as lithographic printing plate precursors typically comprise a top layer applied over the hydrophilic surface of a substrate. The top layer typically includes one or more radiation-sensitive components, which may be dispersed in a suitable binder. Alternatively, the radiation-sensitive component can also be the binder material. If, after imaging, the imaged regions of the top layer are removed in the developing process revealing the underlying hydrophilic surface of the substrate, the precursor is positive working. Conversely, if the unimaged regions are removed by the developing process, the precursor is negative-working. In each instance, the regions of the top layer (i.e., the image areas) that remain are ink-receptive, and the regions of the hydrophilic surface revealed by the developing process accept water and aqueous solutions, typically a fountain solution, and repel ink.

Imaging of the imageable element with ultraviolet and/or visible radiation is typically carried out through a mask, which has clear and opaque regions. Imaging takes place in the regions under the clear regions of the mask but does not occur in the regions under the opaque regions of the mask. The mask is usually a photographic negative of the desired image. If corrections are needed in the final image, a new mask must be made. This is a time-consuming process. In addition, the mask may change slightly in dimension due to changes in temperature and humidity. Thus, the same mask, when used at different times or in different environments, may give different results and could cause registration problems.

Direct digital imaging of imageable elements, which obviates the need for imaging through a mask, is becoming increasingly important in the printing industry. Thermally imageable elements have been developed for use with infrared lasers. Two different regions of the infrared spectrum are typically used for imaging: 800 nm±50 nm and 1050 nm±50 nm. Suitable commercially available imaging devices, for example, have lasers that emit at about 830 nm, at about 1056 nm, or at about 1064 nm.

Imageable elements designed for use with infrared lasers contain infrared absorbing compounds, known as photothermal conversion materials, that absorb infrared radiation and convert it to heat. Typically, these materials are effective absorbers in one of these two spectral regions, but not in both spectral regions. Imageable elements that contain these materials are sensitive to radiation in one these regions but cannot be readily imaged by imaging devices that produce radiation in the other spectral region. Consequently, different products must be manufactured for use with different types of imaging devices. In addition, the infrared absorbing compounds typically have counter ions that contain halogen ions and/or heavy metals, such as arsenic or antimony, materials that can cause environmental contamination.

Thus, a need exists for thermally imageable elements that can be readily imaged either with 800 nm±50 nm radiation or with 1050 nm±50 nm radiation and do not contain materials that can cause environmental contamination.

SUMMARY OF THE INVENTION

In one aspect, the invention is an infrared absorbing compound. The infrared absorbing compound is selected from the compounds represented by Structures I, III, and III.

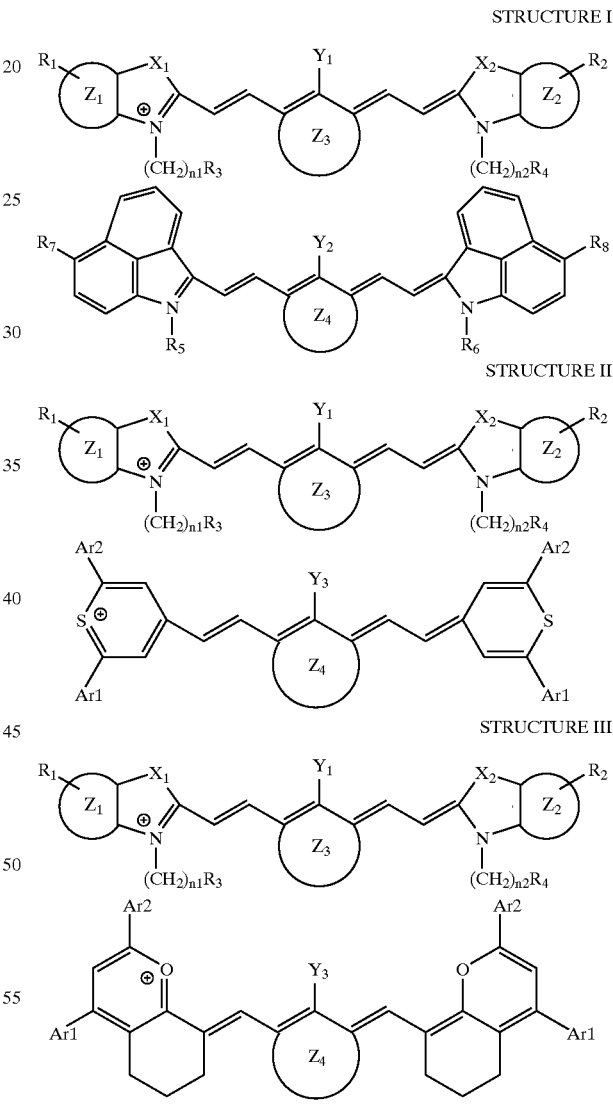

STRUCTURE I

STRUCTURE II

STRUCTURE III in which:

$Y_1$, $Y_2$, and $Y_3$ are each independently hydrogen, halo, alkyl, phenyl, substituted phenyl, phenylamino, diphenylamino, or phenylthio;

$R_1$, $R_2$, $R_3$, and $R_4$ are each independently hydrogen, alkyl, or $SO_3^-$, with the proviso that two of $R_1$, $R_2$, $R_3$, and $R_4$ are $SO_3^-$;

$R_5$ and $R_6$ are each independently alkyl, aryl, aralkyl, hydroxyalkyl, alkoxyalkyl, aminoalkyl, carboxyalkyl, or sulfoalkyl;

$R_7$ and $R_8$ are each independently hydrogen, alkyl, or halo;

$Ar_1$ and $Ar_2$ are each independently phenyl or substituted phenyl;

$Z_1$, and $Z_2$ are each independently a benzo group or a naphtho group;

$Z_3$ and $Z_4$ are each independently two hydrogen atoms, a cyclohexene residue, or a cyclopentene residue;

$X_1$ and $X_2$ are each independently S, O, NH, $CH_2$, or $C(CH_3)_2$; and $n_1$ and $n_2$ are each independently 0 to 4.

In another aspect, the invention is an imageable element comprising the infrared absorbing compound. In yet another aspect, the invention is a method for forming an image by imaging the imageable element with either 800 nm±50 nm radiation or with 1050 nm±50 nm radiation, and developing the resulting imaged imageable element.

When used as photothermal conversion materials in imageable elements, these infrared absorbing compounds provide an efficient method for forming images by direct digital imaging using either 800 nm±50 nm radiation or 1050 nm±50 nm radiation. Because they contain two chromaphores, these compounds are efficient absorbers in two different wavelength regions. In addition, they are free of halogen ions and do not contain heavy metals, such as arsenic or antimony, that can cause environmental contamination.

DETAILED DESCRIPTION OF THE INVENTION

Unless the context indicates otherwise, in the specification and claims, the terms binder, infrared absorbing compound, coating solvent, and similar terms also include mixtures of such materials. Unless otherwise specified, all percentages are percentages by weight. Thermal imaging refers to imaging with a hot body, such as a thermal head, or with infrared radiation.

Infrared Absorbing Compounds

The structure of the infrared absorbing compounds is shown in Structures I, II, and III, above. The infrared absorbing compounds comprise an anion that absorbs infrared radiation at 800 nm±50 nm and a cation that absorbs infrared radiation at 1050 nm±50 nm. The anion has two $SO_3^-$ groups.

$Y_1$, $Y_2$, and $Y_3$ are each independently hydrogen, halo, alkyl, phenyl, substituted phenyl, phenylamino, diphenylamino, or phenylthio. Typical halo groups are fluoro, chloro, bromo, and iodo. Typical alkyl groups are 2-methylbutyl, 3-methylbutyl, pentyl, hexyl, heptyl, octyl, nonyl, decyl, 4-methylpentyl, 3-methylpentyl, 2-methylpentyl, 2-methylhexyl, 2-ethylpentyl, 5-methylhexyl, 2,2,4-trimethylpentyl, cyclohexyl, and alkyl groups of one to four carbon atoms, such as methyl, ethyl, i-propyl, n-propyl, cyclopropyl, cyclobutyl, i-butyl, s-butyl, t-butyl, and n-butyl. Typical substituted phenyl groups are p-methylphenyl, m-methylphenyl, o-methylphenyl, p-methoxyphenyl, m-methoxyphenyl, o-methoxyphenyl, p-ethoxyphenyl, p-ethylphenyl, p-i-propylphenyl, p-chlorophenyl, p-bromophenyl, p-cyanophenyl, m-cyanophenyl, p-fluorophenyl, p-nitrophenyl, p-thiomethoxyphenyl, p-(N,N-dimethylamino)phenyl, pentafluorophenyl, pentachlorophenyl, p-trifluoromethylphenyl, 3,5-dichlorophenyl, 3,5-dimethylphenyl, 3,5-diethylphenyl, and 2,4,6-trimethylphenyl.

Typically, $Y_1$, $Y_2$, and $Y_3$ are each independently phenyl, hydrogen, chloro, phenylthio, or diphenylamino.

$R_1$, $R_2$, $R_3$, and $R_4$ are each independently hydrogen, alkyl, or $SO_3^-$ groups. Two of $R_1$, $R_2$, $R_3$, and $R_4$ are $SO_3^-$ groups, so that the anion has two $SO_3^-$ groups and has an overall charge of minus one. Typical alkyl groups are listed above. Preferred alkyl groups for $R_1$, $R_2$, $R_3$, and $R_4$ are methyl and ethyl.

$R_5$ and $R_6$ are each independently alkyl, aryl, aralkyl, hydroxyalkyl, alkoxyalkyl, aminoalkyl, carboxyalkyl, or sulfoalkyl. Typical alkyl groups are listed above. Typical aryl groups are phenyl; substituted phenyl such as are listed above; 1-naphthyl; 2-naphthyl; and substituted 1- and 2-naphthyl. Typical aralkyl groups are benzyl, 2-phenylethyl, 2-phenylpropyl, 3-phenylpropyl, 4-phenylbutyl. Typical hydroxyalkyl groups are 2-hydroxyethyl, 2-hydroxypropyl, 3-hydroxyproyl, 4-hydroxybutyl, and 2,2-dimethyl-2-hydroxyethyl. Typical alkoxyalkyl groups are 2-methoxyethyl, 2-ethoxyethyl, 2-(2-methoxyethyl)ethyl, and 4-methoxybutyl. Typical aminoalkyl groups are 2-aminoethyl, 2-aminopropyl, 3-amionpropyl, and 4-aminobutyl. Typical carboxyalkyl groups are carboxymethyl, 2-carboxyethyl, 2-carboxypropyl, 3-carboxypropyl, and 4-carboxybutyl. Typical sulfoalkyl groups are 2-sulfoethyl, 3-sulfopropyl, 3-sulfobutyl, and 4-sulfobutyl. $R_5$ and $R_6$ are preferably each independently an alkyl group, more preferably an alkyl group of one to four carbon atoms, such as are listed above.

$R_7$ and $R_8$ are each independently hydrogen, alkyl, or halo. Typical alkyl groups are listed above. Typical halo groups are fluoro, chloro, bromo, and iodo. $R_7$ and $R_8$ are preferably hydrogen, methyl, ethyl, or chloro.

$Ar_1$ and $Ar_2$ are each independently phenyl or substituted phenyl. Typical substituted phenyl groups are listed above. $Ar_1$ and $Ar_2$ are preferably each independently phenyl, p-methylphenyl, p-methoxyphenyl, or p-chlorophenyl.

$Z_1$ and $Z_2$ are each independently a benzo group or a naphtho group, that is, $Z_1$ and $Z_2$ each independently represent either a benzo moiety or a naphtho moiety.

$Z_3$ and $Z_4$ are each independently two hydrogen atoms, a cyclohexene residue or a cyclopentene residue. That is, $Z_3$ and/or $Z_4$ may each represent either a cyclohexene ring or a cyclopentene ring. Alternatively, the group may an open chain, in which $Z_3$ and/or $Z_4$ is two hydrogen atoms. In this case the structures are represented by —CH=C($Y_1$)—CH= and/or —CH=C($Y_2$)—CH=.

$X_1$ and $X_2$, are each independently S, O. $CH_2$, or $C(CH_3)_2$. Typically, $X_1$ and $X_2$ are each $C(CH_3)_2$.

$n_1$ and $n_2$ are each independently 0 to 4, preferably 1 to 4.

In one embodiment, the infrared absorbing compound has Structure I and $R_1$ and $R_2$ are the same; $R_3$ and $R_4$ are the same; $R_5$ and $R_6$ are the same and $R_7$ and $R_8$ are the same; $Z_1$ and $Z_2$ are the same; $X_1$ and $X_2$ are the same; and $n_1$ and $n_2$ are the same. In another embodiment, the infrared absorbing compound has Structure II or Structure III and $R_1$ and $R_2$ are the same; $R_3$ and $R_4$ are the same; $Z_1$ and $Z_2$ are the same; $X_1$ and $X_2$ are the same; n, and $n_2$ are the same; and $Ar_1$ and $Ar_2$ are the same.

The infrared absorbing compounds may be prepared by mixing a solution of a salt that contains the desired infrared absorbing cation with a solution of a salt that contains the desired infrared absorbing anion and filtering off the resulting precipitate. The anion of the salt that contains the desired infrared absorbing cation is typically, for example, a sulfate, bisulfate, or halide, such as chloride or bromide. The cation of the salt that contains the desired anion is typically ammonium, substituted ammonium such as trimethyl ammonium or tri-n-butyl ammonium, lithium, sodium, or potassium. The solvent may be water or a solvent including a mixture of water and a hydrophilic solvent such an as alcohol, for example methanol, ethanol, or propylene glycol methyl ether.

The infrared absorbing compounds are useful as photothermal conversion materials in thermally imageable elements. Photothermal conversion materials absorb radiation and convert it to heat. Imageable elements that are to be imaged with infrared radiation typically comprise a photothermal conversion material. Although a photothermal conversion material is not necessary for imaging with a hot body, imageable elements that contain a photothermal conversion material may also be imaged with a hot body, such as a thermal head or an array of thermal heads. In thermally imageable elements that do not comprise an underlayer, the photothermal conversion material may be in the top layer and/or in a separate absorber layer between the top layer and the substrate.

In elements that also comprise an underlayer, the photothermal conversion material may be in the top layer, and/or in the underlayer, and/or in a separate absorber layer between the top layer and the underlayer. To minimize ablation of the top layer during imaging with an infrared laser, the photothermal conversion material is preferably in the underlayer and/or a separate absorber layer, and the top layer is substantially free of the photothermal conversion material.

The amount of photothermal conversion material in the element is generally sufficient to provide an optical density of at least 0.05, and preferably, an optical density of about 0.5 to about 2 at the imaging wavelength. As is well known to those skilled in the art, the amount of photothermal conversion material required to produce a particular optical density can be determined from the thickness of the layer, the concentration of photothermal conversion material in the layer, and the extinction coefficient of the photothermal conversion material at the wavelength used for imaging using Beer's law.

Imageable Element

The infrared absorbing compounds may be used as the photothermal conversion materials in positive working imageable compositions. The imageable element comprises a top layer, which comprises an imageable composition, over the surface of a substrate. Other layers that are conventional components of imageable elements may also be present. For example, the top layer may be on the substrate, or other layers may be present between the top layer and the substrate.

Positive working thermally imageable elements in which the imageable composition comprises a polymeric material and a dissolution inhibitor are known. The polymeric material is a water insoluble, developer soluble binder. The element may also comprise an underlayer between the top layer and the substrate. The infrared absorbing compound may be present in the top layer, in an underlayer, or in a separate absorber layer between the top layer and the underlayer if the underlayer is present, or between the top layer and the substrate if the underlayer is not present. Single layer elements are disclosed in, for example, West, U.S. Pat. No. 6,090,532; Parsons, U.S. Pat. No. 6,280,899; McCullough, U.S. Pat. Pub. No. 2002/0136961; and WO99/21715, the disclosures of which are all incorporated herein by reference. Multi-layer elements are disclosed in Shimazu, U.S. Pat. No. 6,294,311, and U.S. Pat. No. 6,352,812; Patel, U.S. Pat. No. 6,352,811; and Savariar-Hauck, U.S. Pat. No. 6,358,669, and U.S. Pat. No. 6,528,228; the disclosures of which are all incorporated herein by reference.

Preferably, the binder in the top layer is a light-stable, water-insoluble, developer-soluble, film-forming phenolic resin. Phenolic resins have a multiplicity of phenolic hydroxyl groups, either on the polymer backbone or on pendent groups. Useful phenolic resins include polyvinyl compounds having phenolic hydroxyl groups, such as, polyhydroxystyrenes and copolymers containing recurring units of a hydroxystyrene, and polymers and copolymers containing recurring units of substituted hydroxystyrenes. Novolac resins, resol resins, acrylic resins that contain pendent phenol groups, and polyvinyl phenol resins are preferred phenolic resins. Novolac resins are more preferred.

Novolac resins are commercially available and are well known to those skilled in the art. They are typically prepared by the condensation reaction of a phenol, such as phenol, m-cresol, o-cresol, p-cresol, etc, with an aldehyde, such as formaldehyde, paraformaldehyde, acetaldehyde, etc. or a ketone, such as acetone, in the presence of an acid catalyst. Typical novolac resins include, for example, phenol-formaldehyde resins, cresol-formaldehyde resins, phenol-cresol-formaldehyde resins, p-t-butylphenol-formaldehyde resins, and pyrogallol-acetone resins. Particularly useful novolac resins are prepared by reacting m-cresol, mixtures of m-cresol and p-cresol, or phenol with formaldehyde using conventional conditions.

A solvent soluble novolac resin is one that is sufficiently soluble in a coating solvent to produce a coating solution that can be coated to produce a top layer. When the imageable element comprises an underlayer, the novolac resin preferably has the highest possible weight average molecular weight that maintains its solubility in common coating solvents, such as acetone, tetrahydrofuran, and 1-methoxypropan-2-ol. Top layers comprising novolac resins, including for example m-cresol only novolac resins (i.e. those that contain at least about 97 mol % m-cresol) and m-cresol/p-cresol novolac resins that have up to 10 mol % of p-cresol, having a weight average molecular weight of at least 10,000, typically at least 13,000, especially at least 15,000 and more especially at least 18,000, and even more especially 25,000, have excellent ability to withstand scuffing. Top layers comprising m-cresol/p-cresol novolac resins with at least 10 mol % p-cresol, having a weight average molecular weight of at least 8,000, especially at leas. 10,000, more especially at least 25,000, have excellent ability to withstand scuffing. Novolac resins prepared by solvent condensation produce top layers that have greater ability to withstand scuffing than top layers prepared from similar resins prepared by hot melt condensation.

The top layer preferably comprises a dissolution inhibitor, which functions as a solubility-suppressing component for the binder. Dissolution inhibitors have polar functional groups that are believed to act as acceptor sites for hydrogen bonding with the hydroxyl groups present in the binder. The acceptor sites comprise atoms with high electron density, preferably selected from electronegative first row elements, especially carbon, nitrogen, and oxygen. Dissolution inhibitors that are soluble in the developer are preferred.

Useful polar groups for dissolution inhibitors include, for example, diazo groups; diazonium groups; keto groups; sulfonic acid ester groups; phosphate ester groups; triarylmethane groups; onium groups, such as sulfonium, iodonium, and phosphonium; groups in which a nitrogen atom is incorporated into a heterocyclic ring; and groups that contain a positively charged atom, especially a positively charged nitrogen atom, typically a quaternized nitrogen atom, i.e., ammonium groups. Compounds that contain a positively charged (i.e., quaternized) nitrogen atom useful as dissolution inhibitors include, for example, tetraalkyl ammonium compounds, and quaternized heterocyclic compounds such as quinolinium compounds, benzothiazolium compounds, pyridinium compounds, and imidazolium compounds. Compounds containing other polar groups, such as ether, amine, azo, nitro, ferrocenium, sulfoxide, sulfone, and disulfone may also be useful as dissolution inhibitors. The dissolution inhibitor may be a monomeric and/or polymeric compound that comprises an o-diazonaphthoquinone moiety.

A preferred group of dissolution inhibitors are triarylmethane dyes, such as ethyl violet, crystal violet, malachite green, brilliant green, Victoria blue B, Victoria blue R. Victoria blue BO, BASONYL® Violet 610, and D11 (PCAS, Longjumeau, France). These compounds can also act as contrast dyes, which distinguish the unimaged regions from the imaged regions in the developed imageable element.

When a dissolution inhibitor is present in the top layer, it typically comprises at least about 0.1 wt %, typically about 0.5 wt % to about 30 wt %, preferably about 1 wt % to 15 wt %, based on the dry weight of the layer.

Alternatively, or additionally, the polymeric material in the top layer can comprise polar groups that act as acceptor sites for hydrogen bonding with the hydroxy groups present in the polymeric material and, thus, act as both the polymeric material and dissolution inhibitor. The level of derivatization should be high enough that the polymeric material acts as a dissolution inhibitor, but not so high that, following thermal imaging, the polymeric material is not soluble in the developer. Although the degree of derivatization required will depend on the nature of the polymeric material and the nature of the moiety containing the polar groups introduced into the polymeric material, typically about 0.5 mol % to about 5 mol %, preferably about 1 mol % to about 3 mol %, of the hydroxyl groups will be derivatized. Derivatization of phenolic resins with compounds that contain the diazonaphthoquinone moiety is well known and is described, for example, in West, U.S. Pat. Nos. 5,705,308, and 5,705,322.

One group of polymeric materials that comprise polar groups and function as dissolution inhibitors are derivatized phenolic polymeric materials in which a portion of the phenolic hydroxyl groups have been converted to sulfonic acid esters, preferably phenyl sulfonates or p-toluene sulfonates. Derivatization can be carried out by reaction of the polymeric material with, for example, a sulfonyl chloride such as p-toluene sulfonyl chloride in the presence of a base such as a tertiary amine. A useful material is a novolac resin in which about 1 mol % to 3 mol %, preferably about 1.5 mol % to about 2.5 mol %, of the hydroxyl groups have been converted to phenyl sulfonate or p-toluene sulfonate (tosyl) groups.

When present, the underlayer is between the hydrophilic surface of the substrate and the top layer. After imaging, it is removed by the developer in the imaged regions to reveal the underlying hydrophilic surface of the substrate. The polymeric material in the underlayer is preferably soluble in the developer to prevent sludging of the developer. In addition, it is preferably insoluble in the solvent used to coat the top layer so that the top layer can be coated over the underlayer without dissolving the underlayer.

Polymeric materials useful in the underlayer include those that contain an acid and/or phenolic functionality, and mixtures of such materials. Useful polymeric materials include carboxy functional acrylics, vinyl acetate/crotonate/vinyl neodecanoate copolymers, styrene maleic anhydride copolymers, phenolic resins, maleated wood rosin, and combinations thereof. Underlayers that provide resistance both to fountain solution and aggressive washes are disclosed in Shimazu, U.S. Pat. No. 6,294,311, incorporated herein by reference.

Particularly useful polymeric materials for the underlayer are copolymers of N-phenylmaleimide, methacrylamide, and methacrylic acid, more preferably those that contain about 25 to about 75 mol %, preferably about 35 to about 60 mol % of N-phenylmaleimide; about 10 to about 50 mol %, preferably about 15 to about 40 mol % of methacrylamide; and about 5 to about 30 mol %, preferably about 10 to about 30 mol %, of methacrylic acid. Other hydrophilic monomers, such as hydroxyethyl methacrylate, may be used in place of some or all of the methacrylamide. Other alkaline soluble monomers, such as acrylic acid, may be used in place of some or all of the methacrylic acid.

These polymeric materials are soluble in a methyl lactate/methanol/dioxolane (15:42.5:42.5 wt %) mixture, which can be used as the coating solvent for the underlayer. However, they are poorly soluble in solvents such as acetone and toluene, which can be used as solvents to coat the top layer on top of the underlayer without dissolving the underlayer.

Another group of preferred polymeric materials for the underlayer are copolymers that comprise a monomer that has a urea bond in its side chain (i.e., a pendent urea group), such as are disclosed in Ishizuka, U.S. Pat. No. 5,731,127. These copolymers comprise about 10 to 80 wt %, preferably about 20 to 80 wt %, of one or more monomers represented by the general formula:

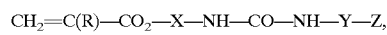

$$CH_2=C(R)-CO_2-X-NH-CO-NH-Y-Z,$$

in which R is —H or —CH$_3$; X is a bivalent linking group; Y is a substituted or unsubstituted bivalent aromatic group; and Z is —OH, —COOH, or —SO$_2$NH$_2$.

R is preferably —CH$_3$. Preferably X is a substituted or unsubstituted alkylene group, substituted or unsubstituted phenylene [—(C$_6$H$_4$)—] group, or substituted or unsubstituted naphthalene [—(C$_{10}$H$_6$)—] group; such as —(CH$_2$)$_n$—, in which n is 2 to 8; 1,2-, 1,3-, and 1,4-phenylene; and 1,4-, 2,7-, and 1,8-naphthalene. More preferably X is unsubstituted and even more preferably n is 2 or 3; most preferably X is —(CH$_2$CH$_2$)—. Preferably Y is a substituted or unsubstituted phenylene group or substituted or unsubstituted naphthalene group; such as 1,2-, 1,3-, and 1,4-phenylene; and 1,4-, 2,7-, and 1,8-naphthalene. More preferably Y is unsubstituted, most preferably unsubstituted 1,4-phenylene. Z is —OH, —COOH, or —SO$_2$NH$_2$, preferably —OH. A preferred monomer is:

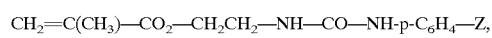

$$CH_2=C(CH_3)-CO_2-CH_2CH_2-NH-CO-NH-p-C_6H_4-Z,$$

in which Z is —OH, —COOH, or —SO$_2$NH$_2$, preferably —OH.

In the synthesis of a copolymer, one or more of the urea group containing monomers may be used. The copolymers also comprise 20 to 90 wt % other polymerizable monomers, such as maleimide, acrylic acid, methacrylic acid, acrylic esters, methacrylic esters, acrylonitrile, methacrylonitrile, acrylamides, and methacrylamides. A copolymer that comprises in excess of 60 mol % and not more than 90 mol % of acrylonitrile and/or methacrylonitrile in addition to acrylamide and/or methacrylamide provides superior physical properties. More preferably the copolymers comprise 30 to 70 wt % urea group containing monomer; 20 to 60 wt % acrylonitrile or methacrylonitrile, preferably acrylonitrile; and 5 to 25 wt % acrylamide or methacrylamide, preferably methacrylamide.

The polymeric materials described above are soluble in polar solvents, such as ethylene glycol monomethyl ether, which can be used as the coating solvent for the underlayer. However, they are poorly soluble in less polar solvents, such as 2-butanone (methyl ethyl ketone), which can be used as a solvent to coat the top layer over the underlayer without dissolving the underlayer.

Both these groups of polymeric materials can be prepared by methods, such as free radical polymerization, well known to those skilled in the art. Synthesis of copolymers that have urea bonds in their side chains is disclosed, for example, in Ishizuka, U.S. Pat. No. 5,731,127.

Another group of polymeric materials that are useful in the underlayer include copolymers that comprise about 10 to 90 mol % of a sulfonamide monomer unit, especially those that comprise N-(p-aminosulfonylphenyl)methacrylamide, N-(m-aminosulfonylphenyl)methacrylamide, N-(o aminosulfonylphenyl)methacrylamide, and/or the corresponding acrylamide. Useful materials that comprise a pendent sulfonamide group, their method of preparation, and monomers useful for their preparation, are disclosed in Aoshima, U.S. Pat. No. 5,141,838. Particularly useful polymeric materials comprise (1) the sulfonamide monomer unit, especially N-p-aminosulfonylphenyl)methacrylamide; (2) acrylonitrile and/or methacrylonitrile; and (3) methyl methacrylate and/or methyl acrylate.

Combination of (1) a copolymer that comprises N-substituted maleimides, especially N-phenylmaleimide; methacrylamides, especially methacrylamide; and acrylic and/or methacrylic acid, especially methacrylic acid with (2) a copolymer that comprises a urea in its side chain or with a copolymer that comprises 10 to 90 mol % of a sulfonamide monomer unit, especially one that comprises N-(p-aminosulfonylphenyl)methacrylamide, N-(m-aminosulfonylphenyl)-methacrylamide, N-(o-aminosulfonylphenyl)methacrylamide, and/or the corresponding acrylamide, can be used. One or more other polymeric materials, such as novolac resins, may also be present in the combination. Preferred other polymeric materials, when present, are novolac resins.

When an absorber layer is present, it is between the top layer and the substrate. When an underlayer is also present, the absorber layer is between the top layer and the underlayer. The absorber layer preferably consists essentially of the infrared absorbing compound and, optionally, a surfactant. It may be possible to use less of the infrared absorbing compound if it is present in a separate absorber layer rather than either the underlayer and/or the top layer. When an absorber layer is present, the top layer is preferably substantially free of infrared absorbing compound, i.e. the top layer preferably does not absorb radiation used for imaging, typically radiation in the range of 800 nm to 1200 nm. The absorber layer preferably has a thickness sufficient to absorb at least 90%, preferably at least 99%, of the imaging radiation. Typically, the absorber layer has a coating weight of about 0.02 $g/m^2$ to about 2 $g/m^2$, preferably about 0.05 $g/m^2$ to about 1.5 $g/m^2$.

To minimize migration of the photothermal conversion material from the underlayer to the top layer during manufacture and storage of the imageable element, the element may comprise a barrier layer between the underlayer and the top layer. The barrier layer comprises a polymeric material that is soluble in the developer. If this polymeric material is different from the polymeric material in the underlayer, it is preferably soluble in at least one organic solvent in which the polymeric material in the underlayer is insoluble. A preferred polymeric material for the barrier layer is polyvinyl alcohol. When the polymeric material in the barrier layer is different from the polymeric material in the underlayer, the barrier layer should be less than about one-fifth as thick as the underlayer, preferably less than a tenth of the thickness of the underlayer.

The developer penetrates and removes the imaged regions of the top layer and the underlying layer or layers, if any, without substantially affecting the complimentary unimaged regions. While not being bound by any theory or explanation, it is believed that image discrimination is based on a kinetic effect. The imaged regions of the top layer are removed more rapidly in the developer than the unimaged regions. Development is carried out for a long enough time to remove the imaged regions of the top layer and, if present, the underlying regions of the other layer or layers of the element, but not long enough to remove the unimaged regions of the top layer. Hence, the top layer is described as being "not removable" by, or "insoluble" in, the developer prior to imaging, and the imaged regions are described as being "soluble" in, or "removable" by, the developer because they are removed, and dissolved and/or dispersed, more rapidly in the developer than the unimaged regions. Typically, the underlayer, if present, is dissolved in the developer and the top layer is dissolved and/or dispersed in the developer.

The imageable composition may also comprise other ingredients such as dyes and surfactants that are conventional ingredients of imageable compositions. Surfactants may be present in the imageable composition as, for example, coating aids. A dye may be present to aid in the visual inspection of the imaged and/or developed element. Printout dyes distinguish the imaged regions from the unimaged regions during processing. Contrast dyes distinguish the unimaged regions from the imaged regions in the developed imageable element. Preferably the dye does not absorb the imaging radiation. Triarylmethane dyes, such as described above, may act as contrast dyes.

The imageable composition may be coated over a variety of substrates. The particular substrate will generally be determined by the intended application. For lithographic printing, the substrate comprises a support, which may be any material conventionally used to prepare imageable elements useful as lithographic printing plates. The support is preferably strong, stable and flexible. It should resist dimensional change under conditions of use so that color records will register in a full-color image. Typically, it can be any self-supporting material, including, for example, polymeric films such as polyethylene terephthalate film, ceramics, metals, or stiff papers, or a lamination of any of these materials. Metal supports include aluminum, zinc, titanium, and alloys thereof.

Typically, polymeric films contain a sub-coating on one or both surfaces to modify the surface characteristics to enhance the hydrophilicity of the surface, to improve adhesion to subsequent layers, to improve planarity of paper substrates, and the like. The nature of this layer or layers depends upon the substrate and the composition of subsequent coated layers. Examples of subbing layer materials are adhesion-promoting materials, such as alkoxysilanes, aminopropyltriethoxysilane, glycidoxypropyltriethoxysilane and epoxy functional polymers, as well as conventional subbing materials used on polyester bases in photographic films.

The surface of an aluminum support may be treated by techniques known in the art, including physical graining, electrochemical graining, chemical graining, and anodizing. The substrate should be of sufficient thickness to sustain the wear from printing and be thin enough to wrap around a printing form, typically from about 100 μm to about 600 μm. Typically, the substrate comprises an interlayer between the aluminum support and the layer of imageable composition. The interlayer may be formed by treatment of the support with, for example, silicate, dextrine, hexafluorosilicic acid, phosphate/fluoride, polyvinyl phosphonic acid (PVPA) or vinyl phosphonic acid copolymers.

The back side of the substrate (i.e., the side opposite the underlayer and layer of imageable composition) may be coated with an antistatic agent and/or a slipping layer or matte layer to improve handling and "feel" of the imageable element. Typically, the top layer has a coating weight of about 0.5 to about 4 g/m$^2$, preferably 0.8 to 3 g/m$^2$.

Preparation of the Imageable Element

The imageable element may be prepared by sequentially applying the underlayer, if present, over the hydrophilic surface of the substrate; applying the absorber layer or the barrier layer, if present, over the underlayer; and then applying the top layer using conventional techniques.

The terms "solvent" and "coating solvent" include mixtures of solvents. These terms are used although some or all of the materials may be suspended or dispersed in the solvent rather than in solution. Selection of coating solvents depends on the nature of the components present in the various layers.

The underlayer, if present, may be applied over the hydrophilic surface by any conventional method, such as coating or lamination. Typically the ingredients are dispersed or dissolved in a suitable coating solvent, and the resulting mixture coated by conventional methods, such as spin coating, bar coating, gravure coating, die coating, or roller coating. If present, the absorber layer may be applied over the underlayer, typically to the surface of the underlayer, by any conventional method, such as those listed above. To prevent the underlayer from dissolving and mixing with the absorber layer when the absorber layer is coated over the underlayer, the absorber layer is preferably coated from a solvent in which the first polymeric material is essentially insoluble.

The top layer is applied over the substrate or, if present, over the underlayer and/or absorber layer. To prevent these layers from dissolving and mixing with the top layer when the top layer is coated, the top layer should be coated from a solvent in which these layers are essentially insoluble. Thus, the coating solvent for the top layer should be a solvent in which the components of the top layer are sufficiently soluble that the top layer can be formed and in which the materials in the other layers are essentially insoluble. Typically the materials in these layers are soluble in more polar solvents and insoluble in less polar solvents so that the solvent or solvents used to coat these layers is more polar than the solvent used to coat the top layer. An intermediate drying step, i.e., drying the underlayer, if present, to remove coating solvent before coating the top layer over it, may also be used to prevent mixing of the layers. Alternatively, the underlayer, the top layer or both layers may be applied by conventional extrusion coating methods from a melt mixture of layer components. Typically, such a melt mixture contains no volatile organic solvents.

Imaging and Processing

The element may be thermally imaged with a laser or an array of lasers emitting modulated near infrared or infrared radiation in a wavelength region that is absorbed by the imageable element. Infrared radiation, especially infrared radiation in the range of about 800 nm to about 1200 nm, is typically used for imaging. Imaging is conveniently carried out with a laser emitting at about 830 nm, about 1056 nm, or about 1064 nm. Suitable commercially available imaging devices include image setters such as the Creo Trendsetter (CREO, Burnaby, British Columbia, Canada), the Screen PlateRite model 4300 and model 8600 (Screen, Rolling Meadows, Chicago, Ill., USA), and the Gerber Crescent 42T (Gerber).

Alternatively, the imageable element may be thermally imaged using a hot body, such as a conventional apparatus containing a thermal printing head. A suitable apparatus includes at least one thermal head but would usually include a thermal head array, such as a TDK Model No. LV5416 used in thermal fax machines and sublimation printers or the GS618-400 thermal plotter (Oyo Instruments, Houston, Tex., USA).

Imaging produces an imaged element, which comprises a latent image of imaged and unimaged regions. Development of the imaged element to form an image converts the latent image to an image by removing the imaged regions, revealing the hydrophilic surface of the underlying substrate.

High pH developers can be used for both single layer and multi-layer positive working imageable elements. High pH developers typically have a pH of at least about 11, more typically at least about 12, even more typically from about 12 to about 14. High pH developers also typically comprise at least one alkali metal silicate, such as lithium silicate, sodium silicate, and/or potassium silicate, and are typically substantially free of organic solvents. The alkalinity can be provided by using a hydroxide or an alkali metal silicate, or a mixture. Preferred hydroxides are ammonium, sodium, lithium and, especially, potassium hydroxides. The alkali metal silicate has a $SiO_2$ to $M_2O$ weight ratio of at least 0.3 (where M is the alkali metal), preferably this ratio is from 0.3 to 1.2, more preferably 0.6 to 1.1, most preferably 0.7 to 1.0. The amount of alkali metal silicate in the developer is at least 20 g $SiO_2$ per 100 g of composition and preferably from 20 to 80 g, most preferably it is from 40 to 65 g. High pH developers can be used in an immersion processor. Typical high pH developers include PC9000, PC3000, Goldstar™, Greenstar™, ThermalPro™, PROTHERM®, and MX1710, aqueous alkaline developers, all available from Kodak Polychrome Grapnics LLC.

Multi-layer positive working imageable elements can also be developed using a solvent based developer in an immersion processor or a spray on processor. Solvent based alkaline developers comprise an organic solvent or a mixture of organic solvents and are typically silicate free. The developer is a single phase. Consequently, the organic solvent or mixture of organic solvents must be either miscible with water or sufficiently soluble in the developer that phase separation does not occur. The following solvents and mixtures thereof are suitable for use in the developer: the reaction products of phenol with ethylene oxide and propylene oxide, such as ethylene glycol phenyl ether (phenoxyethanol); benzyl alcohol; esters of ethylene glycol and of propylene glycol with acids having six or fewer carbon atoms, and ethers of ethylene glycol, diethylene glycol, and of propylene glycol with alkyl groups having six or fewer carbon atoms, such as 2-ethoxyethanol and 2-butoxyethanol. A single organic solvent or a mixture of organic solvents can be used. The organic solvent is typically present in the developer at a concentration of between about 0.5 wt % to about 15 wt %, based on the weight of the developer, preferably between about 3 wt % and about 5 wt %, based on the weight of the developer. Typical commercially available solvent based developers include 956 Developer, 955 Developer and SP200 available from Kodak Polychrome Graphics, Norwalk, Conn., USA.

Commercially available spray on processors include the 85 NS (Kodak Polychrome Graphics). Commercially available immersion processors include the Mercury Mark V processor (Kodak Polychrome Graphics, Norwalk, Conn., USA); the Global Graphics Titanium processor (Global Graphics, Trenton, N.J., USA); and the Glunz and Jensen Quartz 85 processor (Glunz and Jensen, Elkwood, Va., USA).

Following development, the developed imaged imageable element is rinsed with water and dried. Drying may be conveniently carried out by infrared radiators or with hot air. After drying, the resulting lithographic printing plate may be treated with a gumming solution. A gumming solution comprises one or more water-soluble polymers, for example polyvinylalcohol, polymethacrylic acid, polymethacrylamide, polyhydroxyethylmethacrylate, polyvinylmethylether, gelatin, and polysaccharide such as dextrin, pullulan, cellulose, gum arabic, and alginic acid. A preferred material is gum arabic.

A developed and gummed printing plate may also be baked to increase the run length of the plate. Baking can be carried out, for example at about 220° C. to about 240° C. for about 7 to 10 minutes, or at a temperature of 120° C. for 30 min.

INDUSTRIAL APPLICABILITY

The infrared absorbing compounds of the invention are useful as photothermal conversion materials in imageable elements. The imageable elements of the invention are useful as lithographic printing plate precursors. Once the imageable element has been imaged and processed to form a printing plate, printing can be carried out by applying a fountain solution and then a lithographic ink to the image on its surface. Fountain solution is taken up by the surface of the substrate exposed by imaging and development, and the ink is taken up by the complementary regions. The ink is transferred to a suitable receiving material (such as cloth, paper, metal, glass or plastic) either directly or indirectly using an offset printing blanket to provide a desired impression of the image thereon.

The advantageous properties of this invention can be observed by reference to the following examples, which illustrate but do not limit the invention.

EXAMPLES

In the Examples, "coating solution" refers to the mixture of solvent or solvents and additives coated, even though some of the additives may be in suspension rather than in solution, and "total solids" refers to the total amount of nonvolatile material in the coating solution even though some of the additives may be nonvolatile liquids at ambient temperature. Except where indicated, the indicated percentages are percentages by weight based on the total solids in the coating solution.

Glossary

956 Developer Solvent based (phenoxyethanol) alkaline negative developer (Kodak Polychrome Graphics, Norwalk, Conn., USA)

BASONYL® Violet 610 Crystal violet FN; Basic violet 3; Cl 42555; Triarylmethane dye; $lambda_{max}$=588 nm (Aldrich, Milwaukee, Wis., USA)

BYK 307 Polyethoxylated dimethylpolysiloxane copolymer (Byk Chemie, Wallingford, Conn., USA)

Copolymer 1 Copolymer of N-phenylmaleimide, methacrylamide, and methacrylic acid (45:35:20 mol %)

Ethyl Violet C.I. 42600; CAS 2390-59-2 ($lambda_{max}$=596 nm) [(p-$(CH_3CH_2)_2NC_6H_4)_3C^+Cl^-$]

Goldstar™ Developer Metasilicate containing developer (Kodak Polychrome Graphics, Norwalk, Conn., USA)

IR 1040 Dye 4-[2-[3-[(2,6-diphenyl-4H-thiopyran-4-ylidene)ethylidene]-2-phenyl-1-cyclohexene-1-yl]ethenyl]-2,6-diphenylthiopyrylium tetrafluoroborate (Aldrich, Milwaukee, Wis., USA)

IR 1048 Dye [1-butyl-2-[2-[3-[(1-butyl-6-chlorobenz[cd]indol-2(1H)-ylidene)ethylidene]-2-chloro-1-cyclohexen-1-yl]ethenyl]-6-chlorobenz[cd]-indolium tetrafluoroborate (Aldrich, Milwaukee, Wis., USA)

IR 1100 Dye 8-[[3-[(6,7-dihydro-2,4-diphenyl-5H-1-benzopyran-4-yl)methylene]-2-phenyl-1-cyclohexen-1-yl]methylene]-5,6,7,8-tetrahydro-2,4-diphenyl-1-benzopyrylium tetrafluoroborate (Aldrich, Milwaukee, Wis., USA)

KAN707012 dye (N,N-dibutyl-1-butanamine, compound with, 2-[2-[2-chloro-3-[(1,3-dihydro-1,1,3-trimethyl-7-sulfo-2H-benz[e]indol-2-ylidene)ethylidene]-1-cyclohexen-1-yl]ethenyl]-1,1,3-trimethyl-7-sulfo-1H-benz[e]indolium inner salt (Eastman Kodak, Rochester, N.Y., USA)

LB744 Cresol novolac resin (Bakelite, Southampton, UK)

LB6564 Cresol/phenol novolac resin (Bakelite, Southampton, UK)

SD140A Novolac resin; 75% m-cresol/25% p-cresol; MW 1,000 (Borden Chemical, Louisville, Ky., USA)

Example 1

This example illustrates the preparation of (1-butyl-2-[2-[3-[(1-butyl-6-chlorobenz[cd]indol-2(1H)-ylidene)ethylidene]-2-chloro-1-cyclohexen-1-yl]ethenyl]-6-chlorobenz[cd]-indolium, compound with, 2-[2-[2-chloro-3-[(1,3-dihydro-1,1,3-trimethyl-7-sulfo-2H-benz[e]indol-2-ylidene)ethylidene]-1-cyclohexen-1-yl]ethenyl]-1,1,3-trimethyl-7-sulfo-1H-benz[e]indolium inner salt, a compound of the invention.

0.90 g of KAN707012 dye was dissolved in 10 g of water and 20 g of methanol. A solution of 0.70 g of IR 1048 dye in 10 g of water and 20 g of methanol was slowly added to this solution with stirring. The reaction mixture was stored in the dark at room temperature overnight. The resulting precipitate was filtered off, washed with 50 ml of acetone, and dried at ambient temperature for 12 hours. Yield: 1.5 g.

The absorption spectrum of the resulting compound showed maxima at 807 nm and 1003 nm.

Example 2

A coating solution was prepared by dissolving 0.052 g of the compound prepared in Example 1, 1.05 g of LB6564, 0.30 g of LB744, 0.030 g of BASONYL® Violet 610, and 0.004 g of BYK 307 into 22 g of 1,1,3,3-tetramethylurea (Aldrich, Milwaukee, Wis., USA).

The coating solution was coated onto an electrochemically grained and anodized aluminum substrate post-treated with polyvinylphosphonic acid and the resulting element was dried at about 100° C. for about 1 minute on a conveyor oven. Dry coating weight: about 1.5 g/m² (140 mg/ft²).

The resulting imageable element was imaged on a CREO Trendsetter 3244x image setter (CreoScitex, Burnaby, British Columbia, Canada) at 830 nm at a laser power of 15 W and a drum speed of 113 rpm (exposure energy 300 mJ/cm²). An additional imageable element was imaged in a Barco Crescent 42 Imagesetter (Barco Graphics, Vandalia, Ohio, USA) with 1064 nm IR laser at a laser power of 255 units. The resulting imaged imageable elements were developed in Goldstar™ developer (Kodak Polychrome Graphics, Norwalk, Conn., USA) diluted 1:1 with water (50% strength). Each imaged imageable element had a good image after development.

Example 3

This example illustrates the preparation of 4-[2-[3-[(2,6-diphenyl-4H-thiopyran-4-ylidene)ethylidene]-2-phenyl-1-cyclohexene-1-yl]ethenyl]-2,6-diphenylthiopyrylium compound with, 2-[2-[2-chloro-3-[(1,3-dihydro-1,1,3-trimethyl-7-sulfo-2H-benz[e]indol-2-ylidene)ethylidene]-1-cyclohexen-1-yl]ethenyl]-1,1,3-trimethyl-7-sulfo-1H-benz[e]indolium inner salt, a compound of the invention.

0.25 g of KAN707012 dye was dissolved in 2.8 g of water and 5.6 g of methanol. A solution of 0.20 g of IR 1040 dye in 2.8 g of water and 5.6 g of methanol was slowly added to this solution with stirring. The reaction mixture was stored in the dark at room temperature overnight. The resulting precipitate was filtered off, washed with 50 ml of acetone, and dried at ambient temperature for 12 hours. Yield: 0.4 g.

The absorption spectrum of the resulting compound showed maxima at 807 nm and 995 nm.

Example 4

A coating solution was prepared by dissolving 0.016 g of the dye from Example 3, 0.318 g of LB6564, 0.091 g of LB744, 0.009 g of BASONYL® Violet 610, and 0.001 g of BYK 307 in 6.557 g of 1,1,3,3-tetramethylurea.

The coating solution was coated as in Example 2, and the resulting element was dried at 100° C. for about 90 seconds in a Mathis LTE Labdryer oven (Werner Mathis, Switzerland). Dry coating weight: about 1.5 g/m².

The resulting imageable element was imaged on the CREO Trendsetter at 830 nm at a laser power of 15 W and a drum speed of 113 rpm (exposure energy 300 mJ/cm²). The resulting imaged imageable element was developed in Goldstar™ developer diluted 1:1 with water (50% strength). The imaged regions of the top layer were removed by the developer, revealing the underlying hydrophilic support. The unexposed regions of the top layer resisted the developer.

Example 5

This example illustrates the preparation of 8-[[3-[(6,7-dihydro-2,4-diphenyl-5H-1-benzopyran-8-yl)methylene]-2-phenyl-1-cyclohexen-1-yl]methylene]-5,6,7,8-tetrahydro-2,4-diphenyl-1-benzopyrylium compound with, 2-[2-[2-chloro-3-[(1,3-dihydro-1,1,3-trimethyl-7-sulfo-2H-benz[e]indol-2-ylidene)ethylidene]-1-cyclohexen-1-yl]ethenyl]-1,1,3-trimethyl-7-sulfo-1H-benz[e]indolium inner salt, a compound of the invention.

0.25 g of KAN707012 dye was dissolved in 2.8 g of water and 5.6 g of methanol. A solution of 0.20 g of IR 1100 dye in 2.8 g of water and 5.6 g of methanol was slowly added to this solution with stirring. The reaction mixture was stored in the dark at room temperature overnight. The resulting precipitate was filtered off, washed with 50 ml of acetone, and dried at ambient temperature for 12 hours. Yield: 0.4 g.

The absorption spectrum of the resulting compound showed maxima at 807 nm and 1056 nm.

Example 6

A coating solution was prepared by dissolving 0.016 g of the compound prepared in Example 5, 0.318 g of LB6564, 0.091 g of LB744, 0.009 g of BASONYL® Violet 610, and 0.001 g of BYK 307 in 6.557 g of 1,1,3,3-tetramethylurea. The coating solution was coated as described in Example 2 and the resulting element was dried as in Example 4. Dry coating weight: about 1.5 g/m².

The resulting imageable element was imaged and developed as in Example 4. The imaged regions of the top layer were removed by the developer, revealing the underlying hydrophilic support. The unexposed regions of the top layer resisted the developer.

Example 7

A coating solution was prepared by dissolving 0.11 g of the infrared absorbing compound from Example 1, 6.45 g of 10% of Copolymer 1 in methyl lactate and 0.03 g of 10% BYK 307 in diethyl ketone into a mixture of 3.1 g of 1,1,3,3-tetramethylurea and 0.31 g of water. The coating solution was coated onto the substrate of Example 2 and the resulting element was dried at 100° C. for about 1 minute on a conveyor oven. Coating weight of the underlayer: about 2 g/ml.

A coating solution was prepared by dissolving 0.31 g of SD-140A, 0.01 g of ethyl violet, 0.02 g of 10% BYK 307 into 9.66 g of diethyl ketone. The coating solution was coated over the underlayer and the resulting two layer element was dried again at 100° C. for about 1 minute on a conveyor oven. Coating weight of the top layer: about 0.7 g/ml.

The two layer element was imaged on the CREO Trendsetter 3244x image setter at 830 nm at a laser power of 13 W and a drum speed of 250 rpm. The imaged element was developed in 956 developer to produce a good image.

Having described the invention, we now claim the following and their equivalents.

What is claimed is:

1. An infrared absorbing compound of the structure:

STRUCTURE I

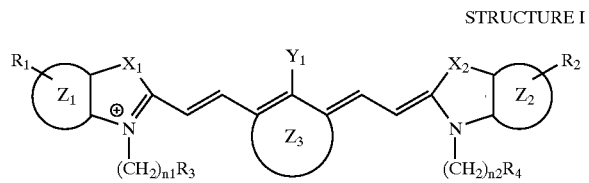

-continued

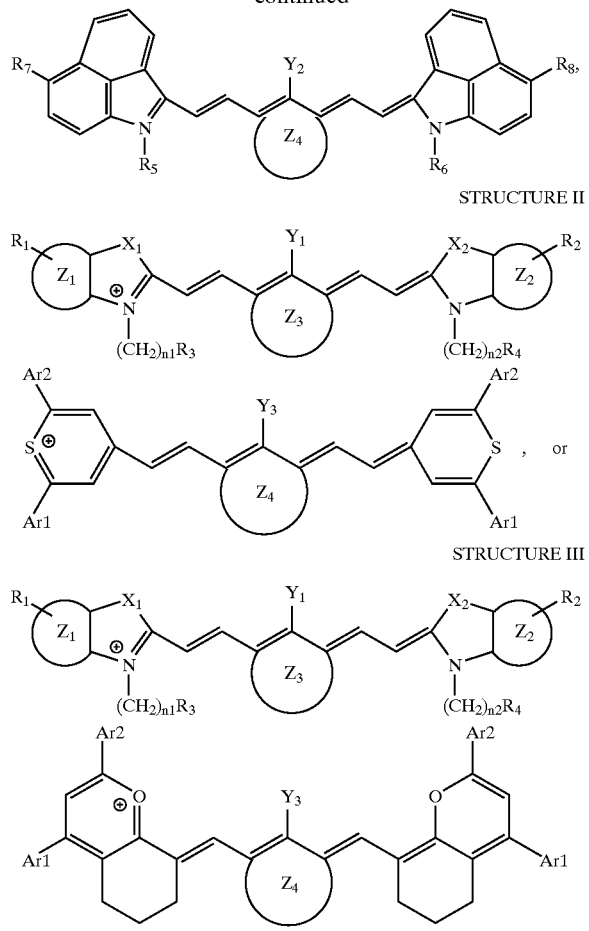

STRUCTURE II

STRUCTURE III in which:

Y$_1$, Y$_2$, and Y$_3$ are each independently hydrogen, halo, alkyl, phenyl, substituted phenyl, phenylamino, diphenylamino, or phenylthio;

R$_1$, R$_2$, R$_3$, and R$_4$ are each independently hydrogen, alkyl, or SO$_3^-$, with the proviso that two of R$_1$, R$_2$, R$_3$, and R$_4$ are SO$_3^-$;

R$_5$ and R$_6$ are each independently alkyl, aryl, aralkyl, hydroxyalkyl, alkoxyalkyl, aminoalkyl, carboxyalkyl, or sulfoalkyl;

R$_7$ and R$_8$ are each independently hydrogen, alkyl, or halo;

Ar$_1$ and Ar$_2$ are each independently phenyl or substituted phenyl;

Z$_1$, and Z$_2$ are each independently a benzo group or a naphtho group;

Z$_3$ and Z$_4$ are each independently two hydrogen atoms, a cyclohexene residue, or a cyclopentene residue;

X$_1$ and X$_2$ are each independently S, O, NH, CH$_2$, or C(CH$_3$)$_2$; and n, and n$_2$ are each independently 0 to 4.

2. The infrared absorbing compound of claim 1 in which:

Y$_1$ is phenyl, hydrogen, chloro, phenylthio, or diphenylamino;

R$_1$, R$_2$, R$_3$, and R$_4$ are each independently hydrogen, methyl, ethyl, or SO$_3^-$ groups;

X$_1$ and X$_2$ are each C(CH$_3$)$_2$; and n$_1$ and n$_2$ are each independently 1 to 4.

3. The infrared absorbing compound of claim 1 in which the compound has Structure I.

4. The infrared absorbing compound of claim 3 in which:

Y$_2$ is phenyl, hydrogen, chloro, phenylthio, or diphenylamino;

R$_5$ and R$_6$ are each independently an alkyl group of one to four carbon atoms; and R$_7$ and R$_8$ are each independently hydrogen, methyl, ethyl, or chloro.

5. The infrared absorbing compound of claim 4 in which R$_1$ and R$_2$ are the same; R$_3$ and R$_4$ are the same; R$_5$ and R$_6$ are the same and R$_7$ and R are the same; Z$_1$ and Z$_2$ are the same; X$_1$ and X$_2$ are the same; and n, and n$_2$ are the same.

6. The infrared absorbing compound of claim 1 in which the compound has Structure II.

7. The infrared absorbing compound of claim 6 in which:

Y$_3$ is phenyl, hydrogen, chloro, phenylthio, or diphenylamino; and

Ar$_1$ and Ar$_2$ are each independently phenyl, p-methylphenyl, p-methoxyphenyl, or p-chlorophenyl.

8. The infrared absorbing compound of claim 7 in which R$_1$ and R$_2$ are the same; R$_3$ and R$_4$ are the same; X$_1$ and X$_2$ are the same; n, and n$_2$ are the same; and Ar$_1$ and Ar$_2$ are the same.

9. The infrared absorbing compound of claim 1 in which the compound has Structure III.

10. The infrared absorbing compound of claim 9 in which:

Y$_3$ is phenyl, hydrogen, chloro, phenylthio, or diphenylamino; and

Ar, and Ar$_2$ are each independently phenyl, p-methylphenyl, p-methoxyphenyl, or p-chlorophenyl.

11. The infrared absorbing compound of claim 10 in which R$_1$ and R$_2$ are the same; R$_3$ and R$_4$ are the same; X$_1$ and X$_2$ are the same; no and n$_2$ are the same; and Ar$_1$ and Ar$_2$ are the same.

12. An imageable element comprising a top layer over a substrate;

in which:

the top layer comprises a binder; and the element comprises an infrared absorbing compound of the structure:

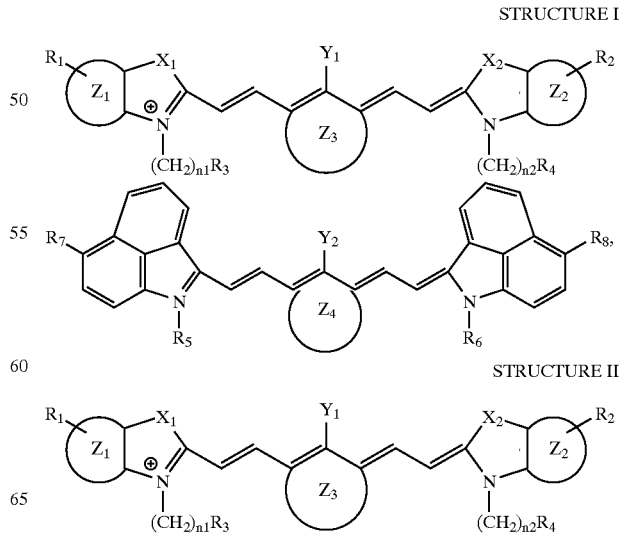

STRUCTURE I

STRUCTURE II

-continued

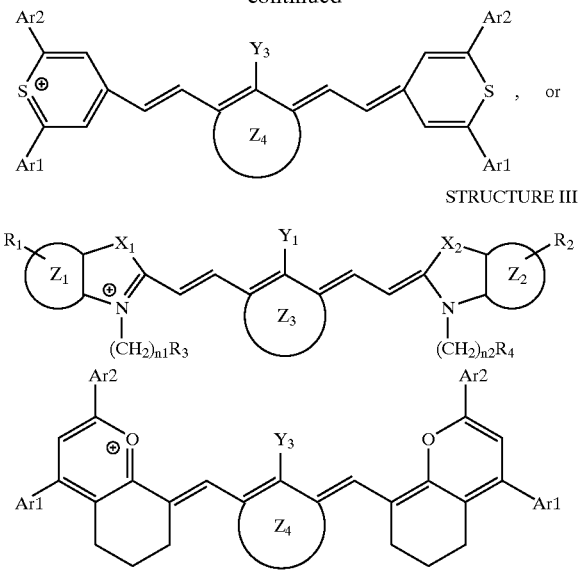

STRUCTURE III in which:
Y$_1$, Y$_2$, and Y$_3$ are each independently hydrogen, halo, alkyl, phenyl, substituted phenyl, phenylamino, diphenylamino, or phenylthio;
R$_1$, R$_2$, R$_3$, and R$_4$ are each independently hydrogen, alkyl, or SO$_3^-$, with the proviso that two of R$_1$, R$_2$, R$_3$, and R$_4$ are SO$_3^-$;
R$_5$ and R$_6$ are each independently alkyl, aryl, aralkyl, hydroxyalkyl, alkoxyalkyl, aminoalkyl, carboxyalkyl, or sulfoalkyl;
R$_7$ and R$_8$ are each independently hydrogen, alkyl, or halo;
Ar$_1$ and Ar$_2$ are each independently phenyl or substituted phenyl;
Z$_1$, and Z$_2$ are each independently a benzo group or a naphtho group;
Z$_3$ and Z$_4$ are each independently two hydrogen atoms, a cyclohexene residue, or a cyclopentene residue;
X$_1$ and X$_2$ are each independently S, O, NH, CH$_2$, or C(CH$_3$)$_2$; and
n$_1$ and n$_2$ are each independently 0 to 4.

13. The element of claim 12 in which the binder is a phenolic resin.

14. The element of claim 13 in which the top layer additionally comprises a dissolution inhibitor.

15. The element of claim 14 in which:
Y$_1$ is phenyl, hydrogen, chloro, phenylthio, or diphenylamino;
R$_1$, R$_2$, R$_3$, and R$_4$ are each independently hydrogen, methyl, ethyl, or SO$_3^-$ groups;
X$_1$ and X$_2$ are each C(CH$_3$)$_2$; and
n$_1$ and n$_2$ are each independently 1 to 4.

16. The element of claim 15 in which:
the compound has Structure I;
Y$_2$ is phenyl, hydrogen, chloro, phenylthio, or diphenylamino;
R$_5$ and R$_6$ are each independently an alkyl group of one to four carbon atoms; and
R$_7$ and R$_8$ are each independently hydrogen, methyl, ethyl, or chloro.

17. The element of claim 15 in which:
the compound has Structure II;
Y$_3$ is phenyl, hydrogen, chloro, phenylthio, or diphenylamino; and
Ar$_1$ and Ar$_2$ are each independently phenyl, p-methylphenyl, p-methoxyphenyl, or p-chlorophenyl.

18. The element of claim 15 in which:
the compound has Structure II; and
Y$_3$ is phenyl, hydrogen, chloro, phenylthio, or diphenylamino; and
Ar$_1$ and Ar$_2$ are each independently phenyl, p-methylphenyl, p-methoxyphenyl, or p-chlorophenyl.

19. The element of claim 15 in which the element does not comprise an underlayer.

20. The element of claim 15 in which the element additionally comprises an underlayer.

21. The element of claim 20 in which the infrared absorbing compound is in the underlayer.

22. A method for forming an image, the method comprising the steps of:
(a) thermally imaging an imageable element comprising a top layer over a substrate and forming an imaged imageable element comprising imaged regions and unimaged regions in the element; and
(b) developing the imaged imageable element with a developer and removing the imaged regions;
in which:
the top layer comprises a binder; and
the element comprises an infrared absorbing compound of the structure:

STRUCTURE I

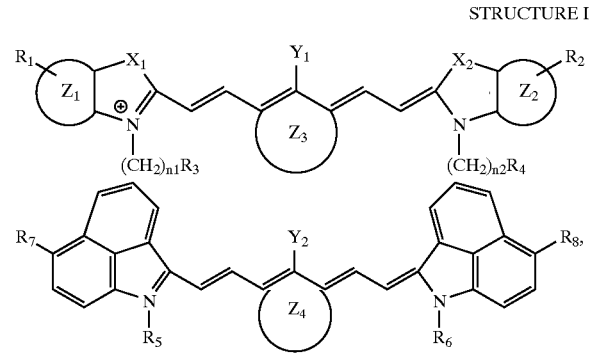

STRUCTURE II

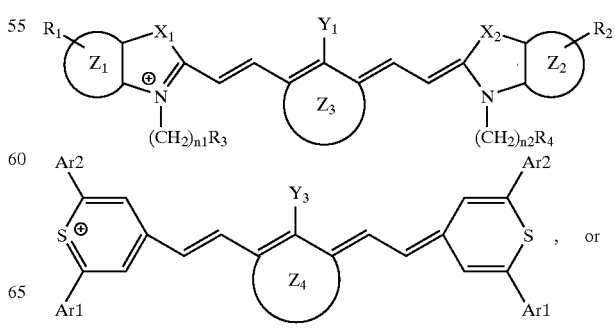

-continued

STRUCTURE III

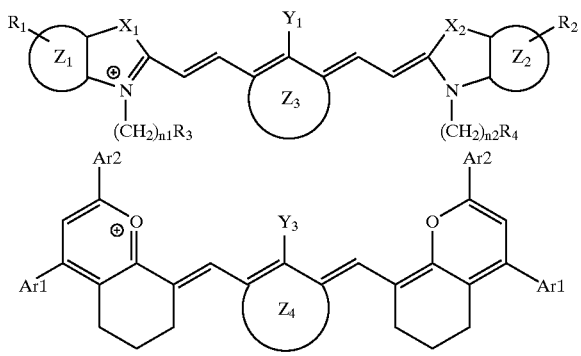

in which:
Y$_1$, Y$_2$, and Y$_3$ are each independently hydrogen, halo, alkyl, phenyl, substituted phenyl, phenylamino, diphenylamino, or phenylthio;
R$_1$, R$_2$, R$_3$, and R$_4$ are each independently hydrogen, alkyl, or SO$_3^-$, with the proviso that two of R$_1$, R$_2$, R$_3$, and R$_4$ are SO$_3^-$;
R$_5$ and R$_6$ are each independently alkyl, aryl, aralkyl, hydroxyalkyl, alkoxyalkyl, aminoalkyl, carboxyalkyl, or sulfoalkyl;
R$_7$ and R$_8$ are each independently hydrogen, alkyl, or halo;
Ar$_1$ and Ar$_2$ are each independently phenyl or substituted phenyl;
Z$_1$, and Z$_2$ are each independently a benzo group or a naphtho group;
Z$_3$ and Z$_4$ are each independently two hydrogen atoms, a cyclohexene residue, or a cyclopentene residue;
X$_1$ and X$_2$ are each independently S, O, NH, CH$_2$, or C(CH$_3$)$_2$; and
n$_1$ and n$_2$ are each independently 0 to 4.

23. The method of claim 22 in which thermal imaging is carried out either with 800 nm±50 nm radiation or 1050 nm±50 nm radiation.

24. The method of claim 23 in which:
Y$_1$ is phenyl, hydrogen, chloro, phenylthio, or diphenylamino;
R$_1$, R$_2$, R$_3$, and R$_4$ are each independently hydrogen, methyl, ethyl, or SO$_3$— groups;
X$_1$ and X$_2$ are each C(CH$_3$)$_2$; and
n$_1$ and n$_2$ are each independently 1 to 4.

25. The method of claim 24 in which:
the compound has Structure I;
Y$_2$ is phenyl, hydrogen, chloro, phenylthio, or diphenylamino;
R$_5$ and R$_6$ are each independently an alkyl group of one to four carbon atoms; and
R$_7$ and R$_8$ are each independently hydrogen, methyl, ethyl, or chloro.

26. The method of claim 24 in which:
the compound has Structure II;
Y$_3$ is phenyl, hydrogen, chloro, phenylthio, or diphenylamino; and
Ar$_1$ and Ar$_2$ are each independently phenyl, p-methylphenyl, p-methoxyphenyl, or p-chlorophenyl.

27. The method of claim 24 in which:
the compound has Structure III; and
Y$_3$ is phenyl, hydrogen, chloro, phenylthio, or diphenylamino; and
Ar$_1$ and Ar$_2$ are each independently phenyl, p-methylphenyl, p-methoxyphenyl, or p-chlorophenyl.

* * * * *